(12) United States Patent
Kim et al.

(10) Patent No.: US 9,395,455 B2
(45) Date of Patent: Jul. 19, 2016

(54) POLYHEDRAL-SHAPED RADIATION COUNTER

(71) Applicant: Korea Institute of Radiological & Medical Sciences, Seoul (KR)

(72) Inventors: Jong Guk Kim, Seongnam-si (KR); Sang June Jeon, Seoul (KR); Kyo Chul Lee, Seoul (KR); Eun Ju Kim, Seoul (KR); Ji Ae Park, Seoul (KR); Jung Young Kim, Namyangju-si (KR); Kyeong Min Kim, Seoul (KR); Sang Moo Lim, Seoul (KR)

(73) Assignee: Korea Institute of Radiological & Medical Sciences

( * ) Notice: Subject to any disclaimer, the term of this patent is extended or adjusted under 35 U.S.C. 154(b) by 151 days.

(21) Appl. No.: 14/728,793

(22) Filed: Jun. 2, 2015

(65) Prior Publication Data

US 2016/0003952 A1    Jan. 7, 2016

(30) Foreign Application Priority Data

Jul. 1, 2014    (KR) .......................... 10-2014-0081985

(51) Int. Cl.
*G01T 1/20*    (2006.01)
*G01T 7/00*    (2006.01)
*G01T 1/24*    (2006.01)
*G01T 7/02*    (2006.01)

(52) U.S. Cl.
CPC ... *G01T 7/00* (2013.01); *G01T 1/20* (2013.01); *G01T 1/248* (2013.01); *G01T 7/02* (2013.01)

(58) Field of Classification Search
CPC .............. G01T 1/20; G01T 1/248; G01T 7/00
USPC ......................................................... 250/366
See application file for complete search history.

(56) References Cited

U.S. PATENT DOCUMENTS

| | | | | |
|---|---|---|---|---|
| 2,779,876 A | * | 1/1957 | Tobias | ................ G01T 1/1645 250/366 |
| 4,066,908 A | * | 1/1978 | Farukhi | ................ G01T 1/202 250/361 R |

FOREIGN PATENT DOCUMENTS

| | | |
|---|---|---|
| JP | H08-136656 A | 5/1996 |
| JP | 2002-221576 A | 8/2002 |
| KR | 10-2008-0072519 | 8/2008 |
| KR | 20110033614 A | 3/2011 |

OTHER PUBLICATIONS

Korean Intellectual Property Office, Office Action, Korean Patent Application No. 10-2014-0081985, Oct. 27, 2015.
Office Action from related Korean Patent Application No. 10-2014-0081985, dated Apr. 11, 2016, 4 pages.

* cited by examiner

*Primary Examiner* — David Porta
*Assistant Examiner* — Meenakshi Sahu
(74) *Attorney, Agent, or Firm* — Klarquist Sparkman, LLP

(57) ABSTRACT

Provided is a polyhedral-shaped radiation counter which measures a radiation level of a radioactive material, in which sensor modules configured to measure the radiation level are disposed at vertexes of a polyhedral shape, respectively, and the sensor modules are connected to each other by rod-shaped frame members disposed in edge positions of the polyhedral shape and face parts of the polyhedral shape form an open space.

12 Claims, 6 Drawing Sheets

POLYHEDRAL-SHAPED RADIATION COUNTER

RELATED APPLICATION

This application claims the benefit of Korean Patent Application No. 10-2014-0081985, filed on Jul. 1, 2014, in the Korean Intellectual Property Office, the disclosure of which is incorporated herein in its entirety by reference.

BACKGROUND

1. Field

One or more exemplary embodiments relate to a radiation counter for measuring a radiation level of a radioactive material sample.

2. Description of the Related Art

Generally, a radiation counter is a device used to measure a level of radiation of a radioactive source from a radioactive material in a real-time and quantitative manner. The radiation counter may be classified into a well counter, a dose calibrator, and the like, depending on its type. An example of the radiation counter is disclosed in Korean Patent Registration No. 0931827.

A well counter is widely known and used as a radiation counter. The well counter has a sensor installed on a side wall of a cylindrical structure having an open top area, so as to measure a radiation level. The well counter also includes a lid structure for covering the open top area of the cylindrical structure. The well counter measures a radiation level while a sample of a radioactive material for radiation level measurement is placed in an inner space of the cylindrical structure.

A radiation counter of the related art, such as the well counter or the dose calibrator, has a limited size space in which a radioactive material sample may be placed, so the sample has to be measured, contained in a bottle having a predetermined shape, such as a vial, which is mainly used. Thus, for the radiation counter of the related art, a shape of a sample is limited to a predetermined shape.

For the well counter, because of having to place a radioactive sample into an inner space of the well counter, a worker is exposed to radiation. More specifically, to synthesize a radioactive medical medicine in an inner space of a hot cell, which is a high-dose radiation work space, a high-dose radioactive sample is taken out of the inner space of the hot cell for measurement and then is placed back into the inner space of the hot cell. In this process, the worker may also be exposed to radiation.

SUMMARY

One or more exemplary embodiments include a radiation counter capable of measuring a radiation level in a reliable manner without being limited by a shape and a size of a radioactive sample to be measured, by innovatively improving a structure of the radiation counter.

Additional aspects will be set forth in part in the description which follows and, in part, will be apparent from the description, or may be learned by practice of the presented exemplary embodiments.

According to one or more exemplary embodiments, a polyhedral-shaped radiation counter which measures a radiation level of a radioactive material, in which sensor modules configured to measure the radiation level are disposed at vertexes of a polyhedral shape, respectively, and the sensor modules are connected to each other by rod-shape frame members disposed in edge positions of the polyhedral shape and face parts of the polyhedral shape form an open space.

The radioactive material may be disposed within a predetermined range from a center of mass of the polyhedral shape.

A plate-shape sample support may be disposed to be slidable in the frame members.

The sample support may be manufactured using synthetic resin made of an organic material, or aluminum.

The sensor modules may include a silicon positive-intrinsic-negative (PIN) diode.

The sensor modules may include a scintillator which generates visible rays in response to incident radiation.

The polyhedral shape may be a regular (or platonic) polyhedral shape.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
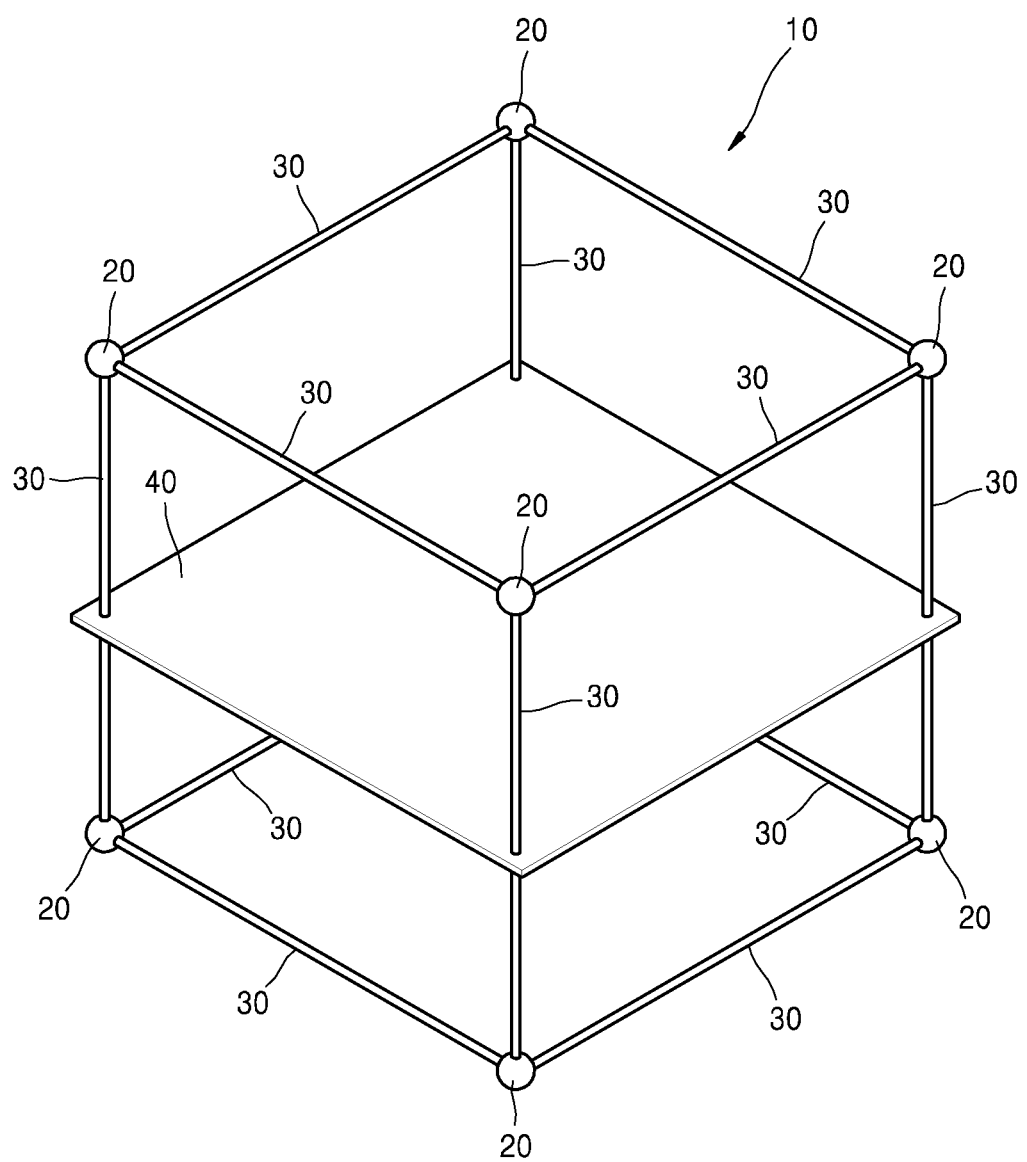
FIG. 1 is a perspective view of a polyhedral-shaped radiation counter according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description.

Hereinafter, one or more exemplary embodiments will be described in more detail with reference to the accompanying drawings.

Figure 2:
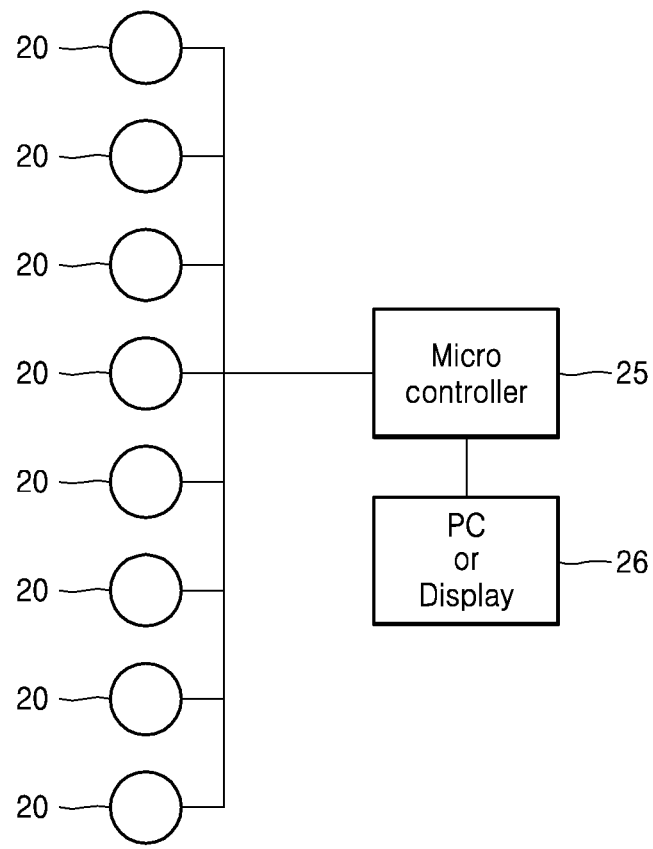
FIG. 2 is a system block diagram of a radiation counter illustrated in FIG. 1.
Figure 3:
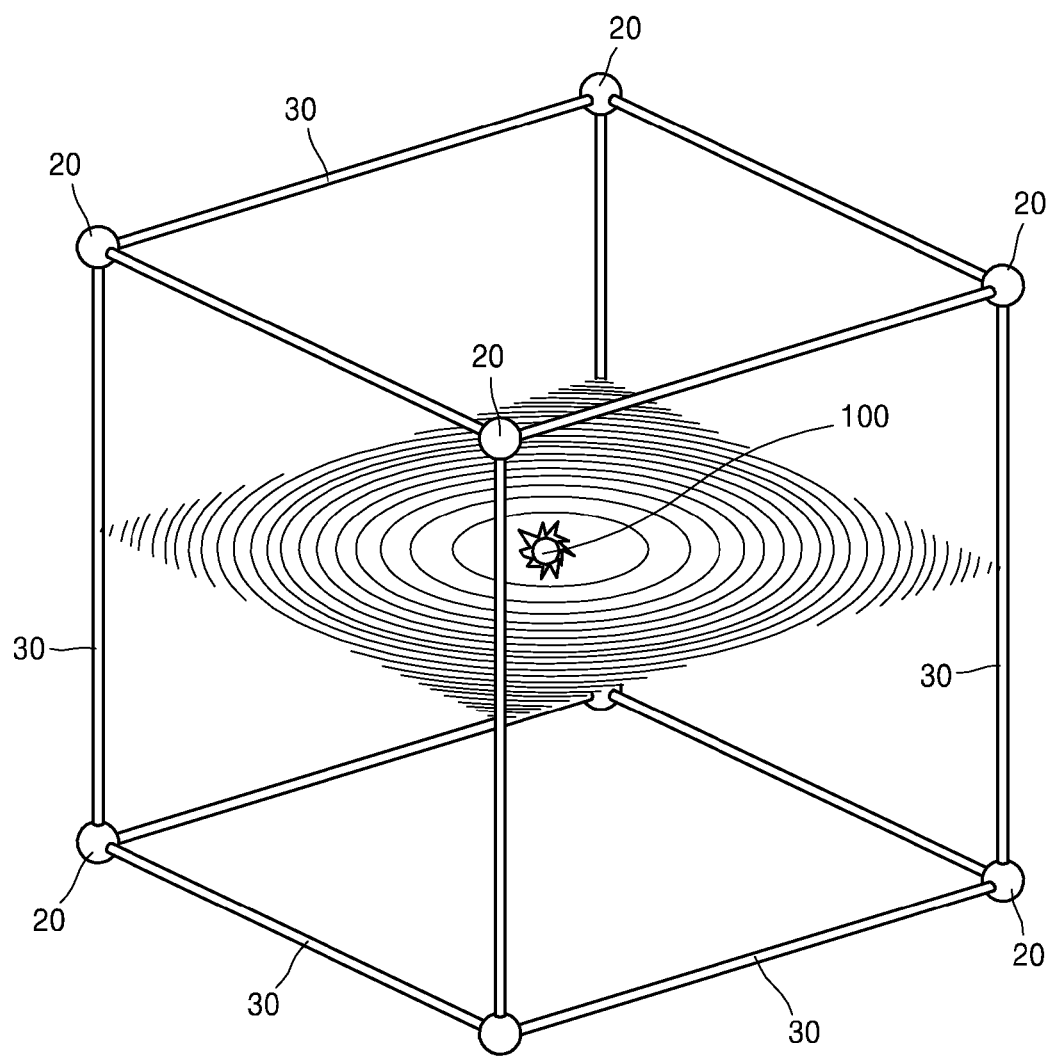
FIG. 3 is a graph showing a deviation of a sum of distances between an arbitrary point (position) and a sensor module with respect to a sum of distances between a center of mass (CM) of the radiation counter illustrated in FIG. 1 and a sensor module.
Figure 4:
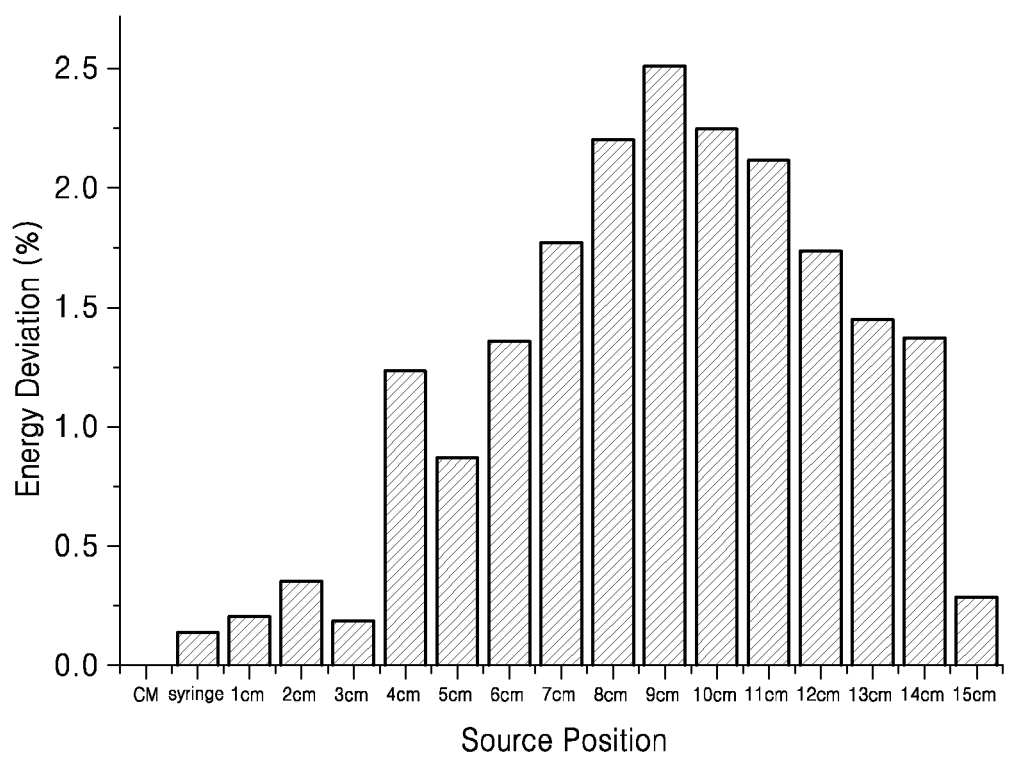
FIG. 4 is a graph showing a deviation of energy absorbed in a sensor module with respect to every 1 cm from a CM of the regular-hexahedral radiation counter illustrated in FIG. 1, which was obtained as a result of Monte-Carlo simulation.
Figure 5:
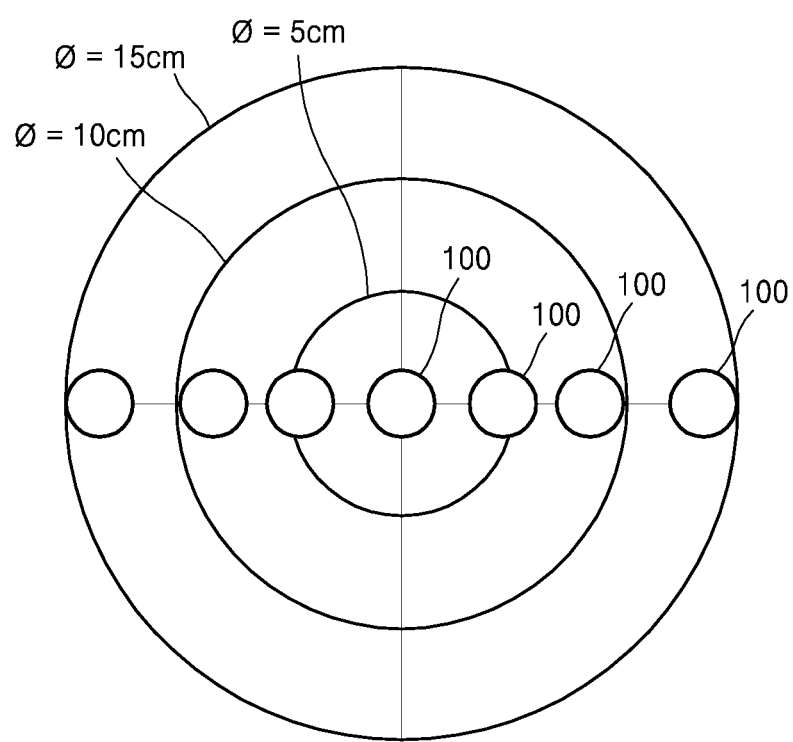
FIG. 5 illustrates positions in which a radioactive material is actually placed in the radiation counter illustrated in FIG. 1.
Figure 6:
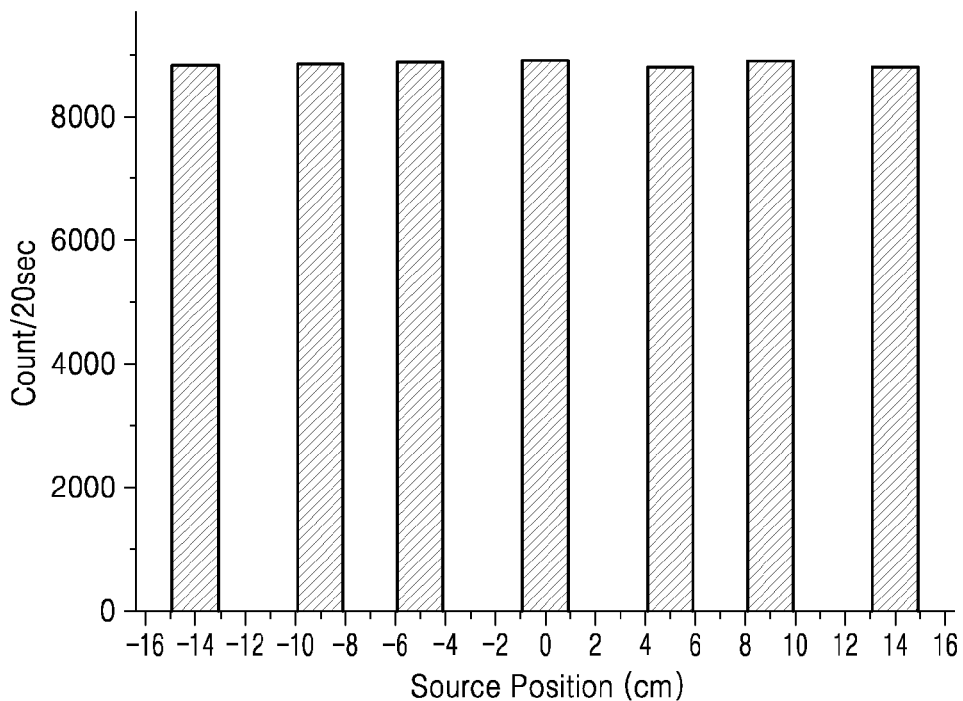
FIG. 6 is a graph showing a count of a radiation level measured in each sensor module according to a placement position of the radioactive material illustrated in FIG. 5.
Figure 7:
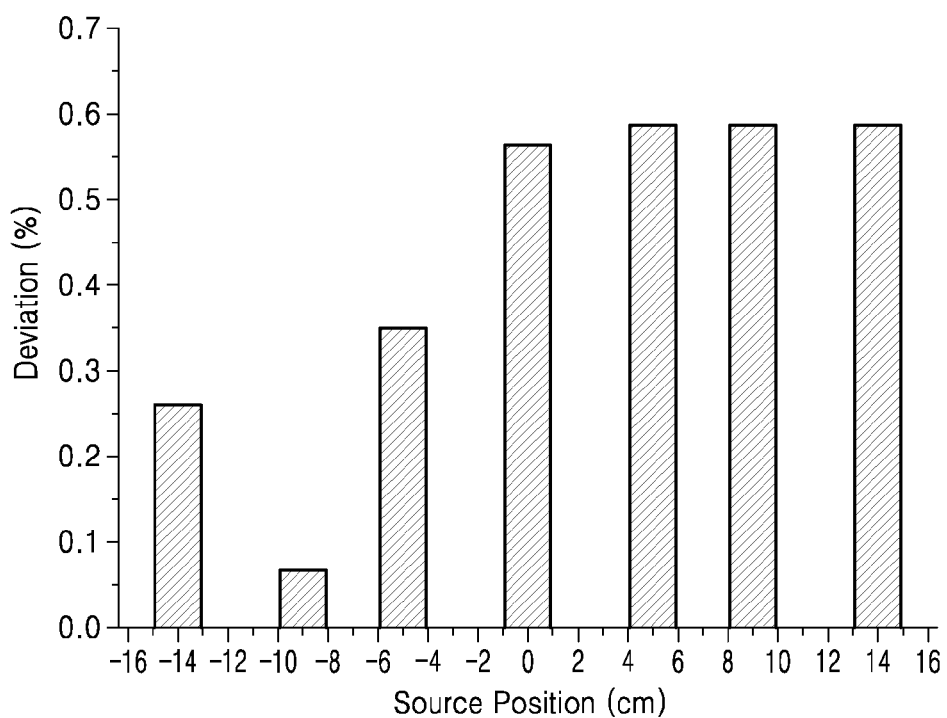
FIG. 7 is a graph showing a deviation of a count of a radiation level measured in each sensor module according to a placement position of the radioactive material illustrated in FIG. 5.

FIG. 1 is a perspective view of a polyhedral-shaped radiation counter according to an embodiment. FIG. 2 is a system block diagram of a radiation counter illustrated in FIG. 1. FIG. 3 is a graph showing a deviation of a sum of distances between an arbitrary point (position) and a sensor module with respect to a sum of distances between a center of mass (CM) of a radiation counter illustrated in FIG. 1 and a sensor module. FIG. 4 is a graph showing a deviation of energy absorbed in a sensor module with respect to every 1 cm from a CM of a regular-hexahedral radiation counter illustrated in FIG. 1 as a result of Monte-Carlo simulation. FIG. 5 illustrates positions in which a radioactive material is actually placed in a radiation counter illustrated in FIG. 1. FIG. 6 is a graph showing a count of a radiation level measured in each sensor according to a placement position of a radioactive material illustrated in FIG. 5. FIG. 7 is a graph showing a deviation of a count of a radiation level measured in each sensor according to a placement position of a radioactive material illustrated in FIG. 5.

Referring to FIGS. 1 to 7, a polyhedral-shaped radiation counter 10 (hereinafter, referred to as a radiation counter) according to an exemplary embodiment is a device for measuring a radiation level of a radioactive material. The radiation counter 10 may include multiple sensor modules 20 and a frame member 30.

The multiple sensor modules 20 are sensors for measuring a radiation level radiated from a radioactive material. The sensor module 20 is disposed in each vertex of a polyhedral shape. As the number of vertexes of the polyhedral shape increases, the number of disposed detectors increases and the inaccuracy of each detector also increases, such that the polyhedral shape needs to have a minimum number of vertexes. Thus, the polyhedral shape is preferably a platonic polyhedral shape such as a tetrahedron, a cube, an octahedron, a dodecahedron, an icosahedron, or the like.

The sensor module 20 may use, for example, a semiconductor sensor. For instance, the sensor module 20 may adopt an optical sensor such as a silicon Positive-Intrinsic-Negative (PIN) diode. More specifically, the sensor module 20 may include a silicon PIN diode, a pre-amplifier for making electric charges generated from the silicon PIN diode into a voltage pulse form, an amplifier for amplifying an electric signal generated by the pre-amplifier, and a comparator for removing noise from a signal amplified by the amplifier and converting the amplified signal into a digital signal. The sensor module 20 may be manufactured to cover or receive the above-described sensor structure with a material passing radiation therethrough well. For example, the sensor module 20 may protect the sensor structure with a material such as paper clay or synthetic resin. The sensor module 20 may include a scintillator for generating visible rays through radiation application. The scintillator may adopt an inorganic scintillator like NaI:TI, CsI:TI, BGO, GSO, LSO, LYSO, LaBr3, or the like, or an organic scintillator such as an anthracene, a stilbene or a plastic scintillator. The sensor module 20 may be applied with a scintillating paint in which a scintillator is mixed into synthetic resin dissolved in an organic solvent. As the scintillator is included in the sensor module 20, for a low dose in which radiation sensed in the sensor module 20 is not enough due to a low strength of radiation, a signal is amplified to improve measurement sensitivity. Detection sensitivity may be controlled depending on the thickness of the scintillating paint applied onto the sensor module 20.

The multiple sensor modules 20 are connected to a micro controller 25 in a wired or wireless manner. The micro controller 25 processes the digital signal converted in the comparator and sums up a radiation level measured in each sensor module 20.

The micro controller 25 outputs a measurement result to a personal computer (PC) or a dedicated display 26 to allow a user to see the measured radiation level.

The frame member 30 is a structure in a rod shape. Multiple frame members 30 are provided. The frame member 30 interconnects the sensor modules 20 to form one structure. The frame member 30 is disposed in an edge position of the polyhedral shape. Except for parts occupied by the sensor module 20 and the frame member 30, the other parts of the polyhedral shape form an open space.

If a radiation level of a radioactive material 100 is measured using the radiation counter 10, the radioactive material 100 may be disposed in a predetermined range from the CM of the polyhedral shape.

The radiation counter 10 may include a sample support 40 to easily dispose the measured radioactive material near the CM of the polyhedral shape.

The sample support 40 may be installed in the frame member 30. The sample support 40 may be preferably disposed in the frame member 30 in a sliding manner. The sample support 40 may be formed in plate-shape structure. The sample support 40 may include a hole through which the frame member 30 passes and a stopper for fixing the sample support 40 in a particular position.

The sample support 40 may be manufactured with synthetic resin made of organic materials or aluminum. The sample support 40 may be preferably manufactured with a material passing radiation therethrough well.

Hereinbelow, effects that may be obtained by exemplary embodiments will be described with reference to a process of measuring a radiation level of a radioactive material by using the radiation counter 10 including the above-described elements and a result of the measurement.

To measure a radiation level of a radioactive material by using the radiation counter 10, the radioactive material 100 is disposed near a CM of the polyhedral shape. To obtain a theoretically identical result, the radioactive material 100 needs to be positioned accurately in the CM of the polyhedral shape. However, a test has been performed regarding whether a reliable measurement result may be obtained even when a radioactive material leaves the CM of the polyhedral shape.

Referring to FIG. 3, for the test, a regular-hexahedral radiation counter was manufactured. Assuming that a radioactive material is disposed at a particular position on a plane including the CM of the regular hexahedron, a sum of distances between the particular position and respective vertexes of the sensor module 20 was calculated and contour lines are drawn with respect to a deviation of 1% of the sum of distances between the CM and respective vertexes in FIG. 3. That is, among circles shown in FIG. 3, the innermost circle indicates an area where a deviation between a sum of distances between a position at which the radioactive material is located and respective vertexes and a sum of distances between the CM and the respective vertexes is 1%. The other circles drawn sequentially outward from the innermost circle indicate areas in which the deviation increases on a 1% basis.

FIG. 4 is a graph showing a deviation of energy absorbed in a sensor module with respect to every 1 cm from a CM of the regular-hexahedral radiation counter illustrated in FIG. 1 as a result of Monte-Carlo simulation. In FIG. 4, 'syringe' on a horizontal axis indicates that the shape of a sample including the radioactive material is in a long-rod shape like a syringe and the sample is located in a CM. Also in FIG. 4, the more rightward along the horizontal axis, the farther from the CM. It can be seen from FIG. 4 that, even when the radioactive material 100 is located out of a predetermined range from the CM, the radiation level measured by the sensor module 20 has a deviation of 2.5% or less. From this result, it is expected that even when the radioactive material 100 is disposed out of the CM of the radiation counter 10 according to an embodiment, a deviation of the radiation level measured by the sensor module 20 would not be large. That is, the radiation level measured by the sensor module 20 is dependent on a distance between the radioactive material 100 and the sensor module 20. However, as can be seen from FIG. 4, for a small deviation in distance, a small deviation in measured radiation level may be expected. More specifically, if the radioactive material 100 leaves the CM, a distance of the radioactive material 100 to any one sensor module 20 may increase, but a distance thereof to another sensor module 20 may decrease, such that if radiation levels measured by the sensor modules 20 are summed up, a relatively small deviation may be obtained. For example, if the radiation counter 10 is manufactured in the shape of a regular hexahedron, each side of which is 25 cm long, an area in which a deviation of a sum of distances is 1% or less is in the shape of a sphere having a diameter of 7.8 cm as shown in FIG. 3.

Referring to FIG. 5, the sensor module 20 is disposed at each vertex of the regular hexahedron. The sensor module 20 measures a radiation level of an F-18 isotope having a radiation level of 1800 mCi (millicurie) while the F-18 isotope moves to a position shown in FIG. 5. Diameters of respective circles shown in FIG. 5 are 5 cm, 10 cm, and 15 cm. For the respective circles, distance deviations between the radioactive materials and the sensor modules 20 were calculated as 1%, 1.7%, and 3.9%, respectively.

FIG. 6 is a graph showing a count of a radiation level measured in the sensor module 20 according to a placement position of the radioactive material 100 illustrated in FIG. 5. Referring to FIG. 6, it can be intuitively seen that the radiation level measured by the sensor module 20 is almost uniform in spite of a distance change.

FIG. 7 is a graph showing a deviation of a count of a radiation level measured in each sensor module according to a placement position of a radioactive material illustrated in FIG. 5. Referring to FIG. 7, even if the radioactive material deviates from the CM of the radiation counter to some degree, a deviation in the radiation level measured by the sensor module 20 does not exceed a maximum of 0.6%.

From this test result, it can be seen that with the radiation counter according to an embodiment, a radiation level measured by a sensor module is maintained relatively uniform even if a radioactive sample is place in a position distant from the CM of a polyhedral shape to some degree. This result indicates that when the radiation level of the radioactive material is measured using the radiation counter, the radiation level is affected a little by the size or shape of the sample.

As described above, according to the one or more of the above exemplary embodiments, in the polyhedral-shaped radiation counter, a sensor module for measuring a radiation level is disposed at a vertex of a polyhedral shape and a radioactive material sample is disposed within a predetermined range from a CM of the polyhedral shape, thereby allowing reliable radiation level measurement in spite of the shape, size, and position of the sample receiving the radioactive material and thus providing a radiation counter that has a simple structure and a low manufacturing cost and facilitates radiation level measurement.

Moreover, the radiation counter according to an embodiment may be manufactured for a high dose and for a low dose.

When the radiation counter is manufactured for a high dose, the radiation counter may be put into the hot cell together with an isotope for radiation level measurement during a test, thereby preventing a tester from being exposed to a radioactive source.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A polyhedral-shaped radiation counter which measures a radiation level of a radioactive material,
wherein sensor modules configured to measure the radiation level are disposed at vertexes of a polyhedral shape, respectively, and
the sensor modules are connected to each other by rod-shape frame members disposed in edge positions of the polyhedral shape and face parts of the polyhedral shape form an open space.

2. The polyhedral-shaped radiation counter of claim 1, wherein the radioactive material is disposed within a predetermined range from a center of mass of the polyhedral shape.

3. The polyhedral-shaped radiation counter of claim 1, wherein a plate-shaped sample support is disposed to be slidable in the frame members.

4. The polyhedral-shaped radiation counter of claim 3, wherein the sample support is manufactured using synthetic resin made of an organic material, or aluminum.

5. The polyhedral-shaped radiation counter of claim 1, wherein the sensor modules comprise a silicon positive-intrinsic-negative (PIN) diode.

6. The polyhedral-shaped radiation counter of claim 5, wherein the sensor modules comprise a scintillator which generates visible rays in response to incident radiation.

7. The polyhedral-shaped radiation counter of claim 1, wherein the polyhedral shape is a regular polyhedral shape.

8. The polyhedral-shaped radiation counter of claim 2, wherein the polyhedral shape is a regular polyhedral shape.

9. The polyhedral-shaped radiation counter of claim 3, wherein the polyhedral shape is a regular polyhedral shape.

10. The polyhedral-shaped radiation counter of claim 4, wherein the polyhedral shape is a regular polyhedral shape.

11. The polyhedral-shaped radiation counter of claim 5, wherein the polyhedral shape is a regular polyhedral shape.

12. The polyhedral-shaped radiation counter of claim 6, wherein the polyhedral shape is a regular polyhedral shape.

* * * * *